United States Patent
Yamaguchi et al.

(10) Patent No.: US 10,101,926 B2
(45) Date of Patent: Oct. 16, 2018

(54) SYSTEM AND APPARATUS FOR CONTROLLING DATA BACKUP USING AN UPDATE PREVENTION INSTRUCTION

(71) Applicant: FUJITSU LIMITED, Kawasaki-shi, Kanagawa (JP)

(72) Inventors: Akio Yamaguchi, Hekinan (JP); Yoshinari Shinozaki, Kawasaki (JP); Hideyuki Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 84 days.

(21) Appl. No.: 14/927,526

(22) Filed: Oct. 30, 2015

(65) Prior Publication Data

US 2016/0179419 A1    Jun. 23, 2016

(30) Foreign Application Priority Data

Dec. 17, 2014  (JP) ................................ 2014-254639

(51) Int. Cl.
| | | |
|---|---|---|
| *G06F 12/00* | (2006.01) | |
| *G06F 3/06* | (2006.01) | |
| *G06F 13/00* | (2006.01) | |
| *G06F 13/28* | (2006.01) | |

(52) U.S. Cl.
CPC ............ *G06F 3/0619* (2013.01); *G06F 3/065* (2013.01); *G06F 3/0683* (2013.01)

(58) Field of Classification Search
CPC ....... G06F 3/0619; G06F 3/065; G06F 3/0683
See application file for complete search history.

(56) References Cited

U.S. PATENT DOCUMENTS

| | | | |
|---|---|---|---|
| 2007/0220071 A1* | 9/2007 | Anzai | .................... G06F 3/0619 |
| 2009/0013138 A1* | 1/2009 | Sudhakar | ............ G06F 11/1435 |
| | | | 711/162 |
| 2010/0131727 A1 | 5/2010 | Eguchi et al. | |
| 2012/0072685 A1 | 3/2012 | Otani | |

(Continued)

FOREIGN PATENT DOCUMENTS

| | | |
|---|---|---|
| JP | 2009-163334 | 7/2009 |
| JP | 2010-123066 | 6/2010 |

(Continued)

OTHER PUBLICATIONS

Japanese Office Action dated Aug. 7, 2018 for the corresponding Japanese Patent Application No. 2014-254639, with English Translation, 7 pages.

*Primary Examiner* — Mark A Giardino, Jr.
(74) *Attorney, Agent, or Firm* — Fujitsu Patent Center

(57) ABSTRACT

A storage management apparatus includes a prevention instructing unit and an execution instructing unit. The prevention instructing unit transmits an update prevention instruction to prevent data in a backup source volume from being updated by an information processing apparatus. After the update prevention instruction is transmitted, the execution instructing unit transmits to the storage apparatus an execution instruction to cause the storage apparatus to execute a snapshot creation process and a backup process. The snapshot creation process creates a snapshot of the backup source volume using a copy-on-write scheme. The backup process copies updated data among the data in the backup source volume to a backup destination volume.

6 Claims, 14 Drawing Sheets

(56) References Cited

U.S. PATENT DOCUMENTS

| | | | |
|---|---|---|---|
| 2012/0233282 A1* | 9/2012 | Voccio | G06F 9/45558 709/212 |
| 2013/0246361 A1* | 9/2013 | Prahlad | G06F 11/1435 707/639 |
| 2014/0201483 A1 | 7/2014 | Min | |

FOREIGN PATENT DOCUMENTS

| | | |
|---|---|---|
| JP | 2012-014286 | 1/2012 |
| JP | 2012-64196 A | 3/2012 |
| JP | 2014-137711 A | 7/2014 |

\* cited by examiner

SYSTEM AND APPARATUS FOR CONTROLLING DATA BACKUP USING AN UPDATE PREVENTION INSTRUCTION

CROSS-REFERENCE TO RELATED APPLICATION

This application is based upon and claims the benefit of priority of the prior Japanese Patent Application No. 2014-254639, filed on Dec. 17, 2014, the entire contents of which are incorporated herein by reference.

FIELD

The embodiments discussed herein are related to a storage system, a storage management apparatus, and a storage management method.

BACKGROUND

As a technique for backing up data, a snapshot is known. A snapshot is an image of data created at a certain point in time. As an example of a method for creating a snapshot, a method using a copy-on-write scheme is known. For example, in the case of creating a snapshot of a first storage area using the copy-on-write scheme, actual data in the first storage area is not copied at the time of creating the snapshot. Instead, management information that enables a reference to the data in the first storage area, such as a pointer or the like indicating the data in the first storage area, is created. Thereafter, upon updating the first storage area, the data before update is saved in a second storage area, and then the first storage area is updated with new data. With this method, it is possible to quickly respond to a request to create a snapshot.

As an example of a technique for snapshots, there has been proposed a technique that reads, from a logical volume, data updated during a period from reception of a first-generation snapshot creation request to issuance of a second-generation snapshot creation request, and writes the data to a pool area.

There has also been proposed a technique that, in a storage system, specifies an area in which data is updated during a period from when a second snapshot preceding a first snapshot is taken to when the first snapshot is taken, based on a differential bitmap table, and copies differential data in the specified area to a backup volume.

See, for example, Japanese Laid-open Patent Publication No. 2010-123066, and Japanese Laid-open Patent Publication No. 2012-14286.

In the case where a snapshot of a storage area is created using the copy-on-write scheme, when reading actual data of the snapshot, at least a part of data in the source storage area is referred to, based on management information. Therefore, if the data that is referred to is damaged due to a failure of a storage device or the like, it is not possible to use the actual data of the snapshot.

One method to solve this problem is to back up actual data of a snapshot in another storage area, based on management information. However, with this method, the entire data corresponding to a snapshot is copied each time backup is requested. Therefore, the processing load during copying of data is increased, so that the performance of other operations (for example, the performance in accessing another storage area) in the apparatus executing the copy operation is reduced.

One method to reduce the processing load during copying of data would be to create a snapshot of a storage area, and execute a differential backup of data in the storage area, for example. However, with this method, when data in the source storage area is updated during the differential backup, the snapshot might not match backup data obtained by the differential backup.

SUMMARY

According to one aspect of the embodiments, there is provided a storage system including a storage apparatus and a storage management apparatus. The storage apparatus includes: a storage device that includes a first storage area and a second storage area, the first storage area being an object that is accessed from an information processing apparatus; and a controller that executes, upon receiving a snapshot creation instruction, a snapshot creation process and a backup process, the snapshot creation process being a process that creates a snapshot of the first storage area using a copy-on-write scheme, the backup process being a process that copies data in the first storage area to the second storage area, wherein when the snapshot creation instruction is received after all the data in the first storage area is copied to the second storage area, the backup process copies updated data among the data in the first storage area to the second storage area. The storage management apparatus transmits the snapshot creation instruction to the storage apparatus, after transmitting an update prevention instruction to prevent the data in the first storage area from being updated by the information processing apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
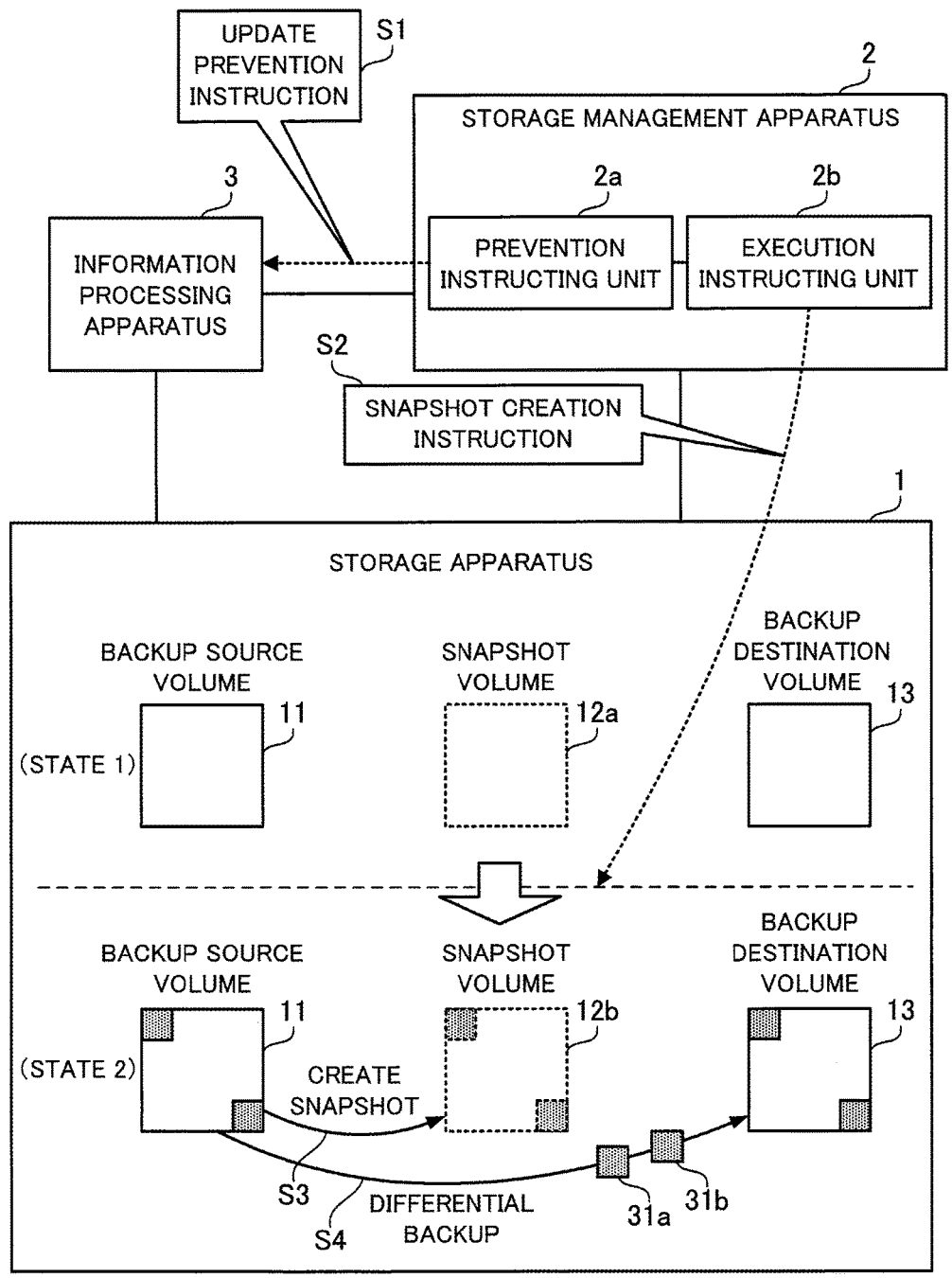
FIG. 1 illustrates a storage system according to a first embodiment.

Several embodiments will be described below with reference to the accompanying drawings, wherein like reference numerals refer to like elements throughout.

(a) First Embodiment

FIG. 1 illustrates a storage system according to a first embodiment. The storage system includes a storage apparatus 1, a storage management apparatus 2, and an information processing apparatus 3.

The storage apparatus 1 includes one or more storage devices. Examples of the storage devices of the storage apparatus 1 may include a hard disk drive (HDD), a solid state drive (SSD), and the like. Further, a first storage area that is accessed from the information processing apparatus 3 is set in the storage apparatus 1. The first storage area is realized by at least one storage device in the storage apparatus 1.

The storage apparatus 1 is able to execute a snapshot creation process that creates a snapshot of the first storage area and a backup process that copies data in the first storage area to a second storage area, in response to an instruction from the storage management apparatus 2. The second storage area is also realized by at least one storage device in the storage apparatus 1. In order to reduce the risk that backup data is lost, it is preferable that the second storage area be realized by a storage device different from the storage device realizing the first storage area.

A backup source volume 11 illustrated in FIG. 1 is an example of the first storage area. A backup destination volume 13 illustrated in FIG. 1 is an example of the second storage area corresponding to the backup source volume 11.

The storage management apparatus 2 manages the operation of the storage apparatus 1. The storage management apparatus 2 is able to instruct the storage apparatus 1 to create a snapshot of the backup source volume 11 that is set in the storage apparatus 1. The information processing apparatus 3 accesses the storage device in the storage apparatus 1. The information processing apparatus 3 is able to access the backup source volume 11 that is set in the storage apparatus 1.

Now, a description will be given of a snapshot creation process executed by the storage apparatus 1, with reference to FIG. 2.

Figure 2:
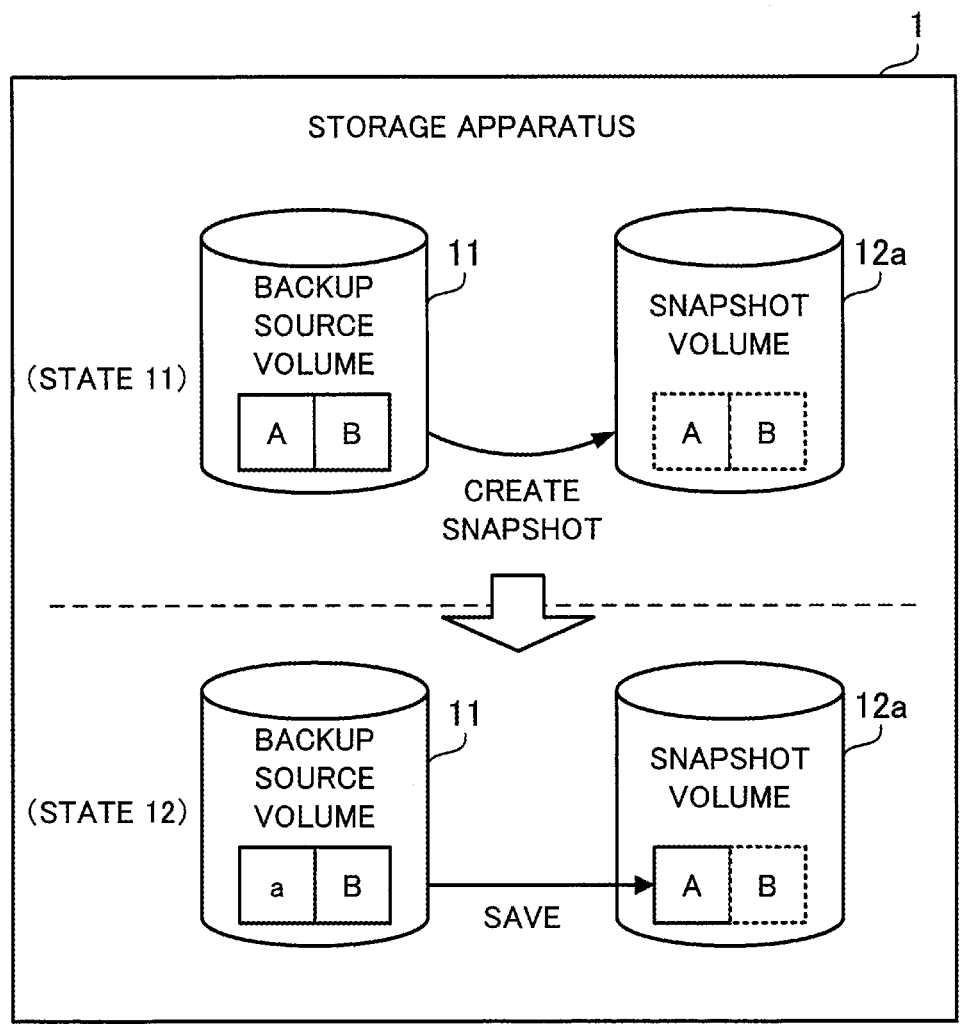
FIG. 2 illustrates an example of a snapshot creation process.

FIG. 2 illustrates an example of a snapshot creation process. As illustrated in FIG. 2, the storage apparatus 1 executes a snapshot creation process using the copy-on-write scheme.

A "state 11" of FIG. 2 is a state in which an instruction to create a snapshot of the backup source volume 11 is received while data A and data B are stored in the backup source volume 11. In this case, the storage apparatus 1 creates, for example, a snapshot volume 12a as data corresponding to a snapshot of the backup source volume 11.

According to the copy-on-write scheme, management information such as a pointer or the like indicating the storage area storing the data A and data B is stored in the snapshot volume 12a, instead of the data A and data B, for example. Accordingly, upon receiving a request to read the snapshot of the backup source volume 11, the storage apparatus 1 is able to read the data A and data B from the backup source volume 11, based on the content of the snapshot volume 12a. In this way, since only the management information is stored in the snapshot volume 12a instead of the actual data, the time taken from reception of an instruction to create a snapshot to transmission of a response indicating completion of the creation is reduced.

A "state 12" of FIG. 2 is a state in which a request to update the data A in the backup source volume 11 with data a is issued from the information processing apparatus 3, after the "state 11". In this case, the storage apparatus 1 copies the data A from the backup source volume 11 to the snapshot volume 12a. When the copying is completed, the storage apparatus 1 updates the data A in the backup source volume 11 with the new data a. Accordingly, when a request to read the snapshot is issued after the update of the data A, the storage apparatus 1 is able to read the data A from the snapshot volume 12a and read the data B from the backup source volume 11, based on the content of the snapshot volume 12a.

In this manner, according to the copy-on-write scheme, when a request to update certain data in the backup source volume 11 is issued after creation of a snapshot, the original data before update is saved in another storage area such as the snapshot volume 12a or the like. Then, after the original data is saved, the original data in the backup source volume 11 is updated with new data.

Note that, in reality, the storage apparatus 1 stores a bitmap that holds values each indicating whether data before update is stored in the snapshot volume 12a, for respective plural sub-areas obtained by dividing the backup source volume 11, for example. When the initial value in the entry of each sub-area in the bitmap is "0", the storage apparatus 1 operates in the following manner.

Upon receiving a request to update data in a certain sub-area in the backup source volume 11 from the information processing apparatus 3, the storage apparatus 1 reads a value in the bitmap corresponding to the sub-area. When the read value is "0", the storage apparatus 1 copies the original data in the sub-area to the snapshot volume 12a, and then updates the original data in the sub-area with new data. Further, the storage apparatus 1 updates the value in the bitmap corresponding to the sub-area to "1". On the other hand, when the read value is "1", the storage apparatus 1 updates the original data stored in the sub-area with new data, without saving the original data. Further, when a request to create a snapshot of the backup source volume 11 is received again, the storage apparatus 1 updates all the values in the bitmap to the initial value "0".

As described above, in the snapshot creation process using the copy-on-write scheme, not all the data that is stored in the backup source volume at the time of reception of the instruction to create a snapshot is stored in the snapshot volume. Upon reading the data of the snapshot, at least a part of the data in the backup source volume is referred to. Accordingly, if the data in the backup source volume that is referred to is damaged due to a failure of the storage device or the like, it is not possible to read the data of the snapshot.

A solution to this problem would be to back up data of a snapshot. The following describes a comparative example of a process for backing up data of a snapshot, with reference to FIG. 3.

Figure 3:
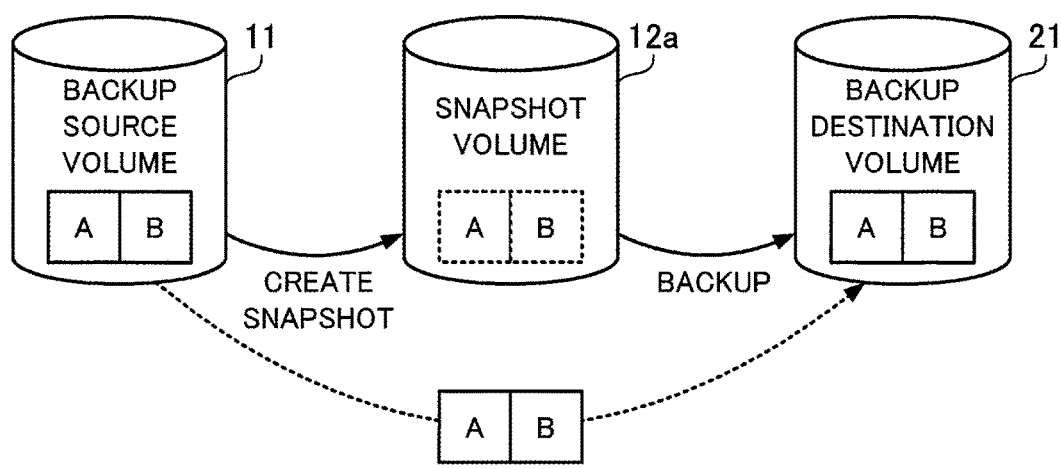
FIG. 3 illustrates a comparative example of a snapshot backup process.

FIG. 3 illustrates a comparative example of a snapshot backup process. It is assumed here that the storage apparatus 1 executes the process. Further, it is assumed that backup data corresponding to the snapshot volume 12a illustrated in FIG. 2 is created, for example.

The storage apparatus 1 creates a backup destination volume 21 for storing backup data corresponding to the snapshot volume 12a. Then, the storage apparatus 1 reads the data A and data B from the backup source volume 11, based on management data stored in the snapshot volume 12a, and stores the data A and data B in the backup destination volume 21. Thus, the actual data corresponding to the snapshot of the backup source volume 11 is backed up in the backup destination volume 21.

According to this method, every time there is a request to back up data of a snapshot, all the data stored in the backup source volume 11 is transferred to another storage area. This increases processing load on the storage apparatus 1 during the backup process, resulting in a reduction in the performance of other operations in the storage apparatus 1, such as an operation of accessing another volume that is set in the storage apparatus 1. Further, the time taken for the backup process is increased, so that the time taken from when a request to back up data is received to when a completion response is returned is increased.

One method to solve these problems would be to cause the storage apparatus 1 to execute a differential backup process of the backup source volume 11, along with creation of a snapshot of the backup source volume 11, in accordance with an instruction from the storage management apparatus 2, for example. A differential backup process is a process for copying only the data that is updated at least after the previous backup process, instead of copying all the data stored in the backup source volume 11. However, with this method, the data in the backup source volume 11 might be updated in response to a request from the information processing apparatus 3 during a backup process. In this case, the snapshot of the backup source volume 11 does not match the backup data.

Now, a description will be made referring back to FIG. 1.

The storage management apparatus 2 includes a prevention instructing unit 2a and an execution instructing unit 2b, as processing functions for solving the above problems. Operations by the prevention instructing unit 2a and the execution instructing unit 2b are realized by execution of a predetermined program by a processor of the storage management apparatus 2, for example. Alternatively, operations of the prevention instructing unit 2a and the execution instructing unit 2b may be realized by execution of respective separate programs.

The prevention instructing unit 2a transmits an update prevention instruction to prevent the data in the backup source volume 11 from being updated by the information processing apparatus 3. In the example of FIG. 1, the update prevention instruction is directly transmitted to the information processing apparatus 3. Upon receiving the update prevention instruction, the information processing apparatus 3 stops update of the data in the backup source volume 11. The update prevention instruction may be transmitted to the information processing apparatus 3 via another apparatus. For example, in the case where there is another management apparatus that manages the operation of the information processing apparatus 3, the update prevention instruction may be transmitted from the prevention instructing unit 2a to the other management apparatus.

After the update prevention instruction is transmitted by the prevention instructing unit 2a, the execution instructing unit 2b transmits a snapshot creation instruction to create a snapshot of the backup source volume 11 to the storage apparatus 1.

Upon receiving the snapshot creation instruction from the execution instructing unit 2b, the storage apparatus 1 executes a process for creating a snapshot of the backup source volume 11 and a differential backup process of the backup source volume 11.

In a "state 1" of FIG. 1, the snapshot volume 12a and the backup destination volume 13 corresponding to the backup source volume 11 are created in the storage apparatus 1, and all the data in the backup source volume is stored in the backup destination volume 13. After this state, data 31a and data 31b in the backup source volume 11 are updated by an access from the information processing apparatus 3. In FIG. 1, this state is illustrated as a "state 2".

In the "state 2", the prevention instructing unit 2a transmits to the information processing apparatus an update prevention instruction to prevent update of the data in the backup source volume 11 (step S1). The information processing apparatus 3 stops update of the data in the backup source volume 11. Subsequently, the execution instructing unit 2b instructs the storage apparatus 1 to create a snapshot of the backup source volume 11 (step S2).

The storage apparatus 1 creates a snapshot volume 12b, as data of the snapshot of the backup source volume 11 (step S3). This snapshot volume 12b stores, for example, management information such as a pointer or the like indicating the actual data, instead of storing the actual data of the backup source volume 11.

Along with the execution of this snapshot creation process, the storage apparatus 1 executes a differential backup process of the backup source volume 11. More specifically, the storage apparatus 1 reads, from the backup source volume 11, only the data 31a and data 31b among the data stored in the backup source volume 11, and overwrites data at corresponding positions in the backup destination volume 13 with the data 31a and data 31b (step S4).

By executing such a differential backup process, it is possible to reduce the load of the process of backing up the actual data in the backup source volume 11, and to reduce the time taken to complete the backup. Further, since a differential backup process is executed after an update prevention instruction is transmitted by the prevention instructing unit 2a, the data in the backup source volume 11 is not updated during the differential backup process. Therefore, the data stored in the backup source volume 11 at the time when an instruction to create a snapshot is issued from the execution instructing unit 2b is reliably backed up in the backup destination volume 13. Accordingly, the consistency between the snapshot of the backup source volume 11 and the backup destination volume 13 is ensured.

(b) Second Embodiment

Figure 4:
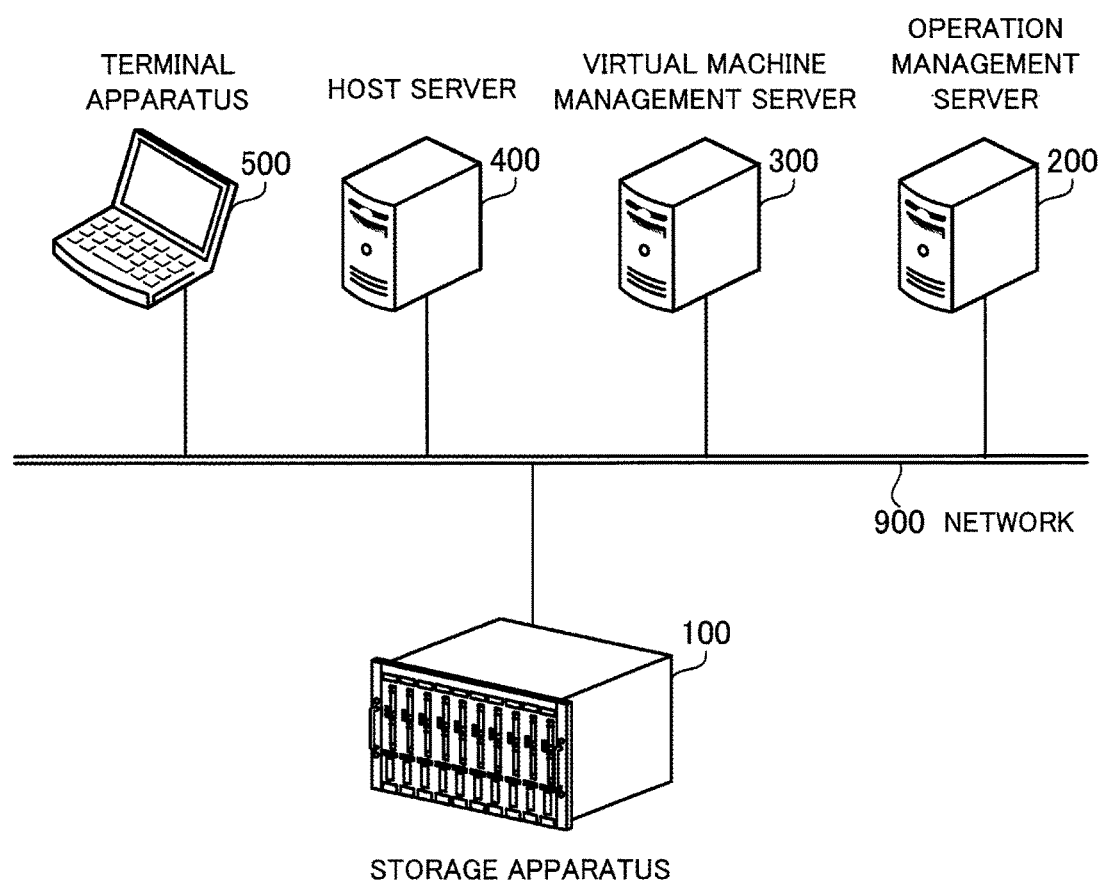
FIG. 4 illustrates a storage system according to a second embodiment.

FIG. 4 illustrates a storage system according to a second embodiment. The storage system includes a storage apparatus 100, an operation management server 200, a virtual machine (VM) management server 300, a host server 400, and a terminal apparatus 500. The storage apparatus 100, the operation management server 200, the virtual machine management server 300, the host server 400, and the terminal apparatus 500 are connected to each other via a network 900. The network 900 may be a local area network (LAN), or a wide area network (WAN) such as the Internet and the like. However, communications between the storage apparatus 100 and the host server 400 are made via a storage area network (SAN).

The storage apparatus 100 is an example of the storage apparatus 1 of FIG. 1. The operation management server 200 is an example of the storage management apparatus 2 of FIG. 1. The host server 400 is an example of the information processing apparatus 3 of FIG. 1.

As will be described below, the storage apparatus 100 includes a plurality of storage devices and a control device. The storage devices store, for example, data used for processing by the host server 400. The control device controls access to the storage devices in the storage apparatus 100. Further, the control device has a function for executing various types of backup processes for the data stored in the storage devices.

The operation management server 200 is a server computer that manages the operation of the apparatuses provided in the storage system, including the storage apparatus 100. For example, the operation management server 200 is able to instruct the storage apparatus 100 to execute various types of backup processes. Further, the operation management server 200 acquires information on a virtual machine that operates on the host server 400 from the virtual machine management server 300, and stores the information. The virtual machine management server 300 is a server computer that manages the operation of the virtual machine which operates on the host server 400.

The host server 400 transmits an access request to the storage apparatus 100, thereby accessing a logical volume defined in the storage apparatus 100. The terminal apparatus 500 is a client computer used by a user. For example, the terminal apparatus 500 transmits a start command of a backup request to the operation management server 200, in response to a user operation. Further, the terminal apparatus 500 transmits a start command of a snapshot creation request to the virtual machine management server 300, in response to a user operation.

Note that in the storage system, there may be a plurality of host servers identical to the host server 400. In this case, the operation management server 200 manages information on each host server. The virtual machine management server 300 manages the operation of a virtual machine that operates on each host server.

On the host server 400, a virtual machine operates under the control of the virtual machine management server 300. Further, a logical volume that is accessed from the virtual machine is set in the storage apparatus 100. This logical volume stores various types of information for realizing the virtual machine. The information for realizing the virtual machine includes, for example, configuration information defining the configuration of the virtual machine, information corresponding to a storage area of a virtual disk provided in the virtual machine (hereinafter referred to as "virtual disk content information"), information corresponding to a storage memory of a virtual memory provided in the virtual machine (hereinafter referred to as "virtual memory content information"), and the like. The virtual machine configuration information, the virtual disk content information, and the virtual memory content information are provided in the form files and are stored in separate logical volumes, for example.

The virtual machine management server 300 provides a function of creating a snapshot of a virtual machine, in response to a request to create a snapshot of the virtual machine. For example, the virtual machine management server 300 may receive a request to create a snapshot of a virtual machine directly from the terminal apparatus 500, or indirectly from the terminal apparatus 500 via the operation management server 200.

Creating a snapshot of a virtual machine is creating a snapshot of a logical volume storing information for realizing the virtual machine such as that described above. Upon receiving the virtual machine backup request, the virtual machine management server 300 transmits an instruction to create a snapshot of the logical volume storing the information for realizing the virtual machine to the storage apparatus 100 via the operation management server 200. The operation management server 200 provides the virtual machine management server 300 with an interface for transparently controlling the storage apparatus 100. With use of this interface, the virtual machine management server 300 is able to transmit the instruction to create a snapshot of the logical volume to the storage apparatus 100.

In the case of virtual machines, it is possible to save the state of an entire virtual machine at a certain point, by stopping the operation of the virtual machine and creating a snapshot of information for realizing the virtual machine, such as that described above. On the other hand, in the case of actual machines, it is not possible to save the state of an entire actual machine at a certain point.

Figure 5:
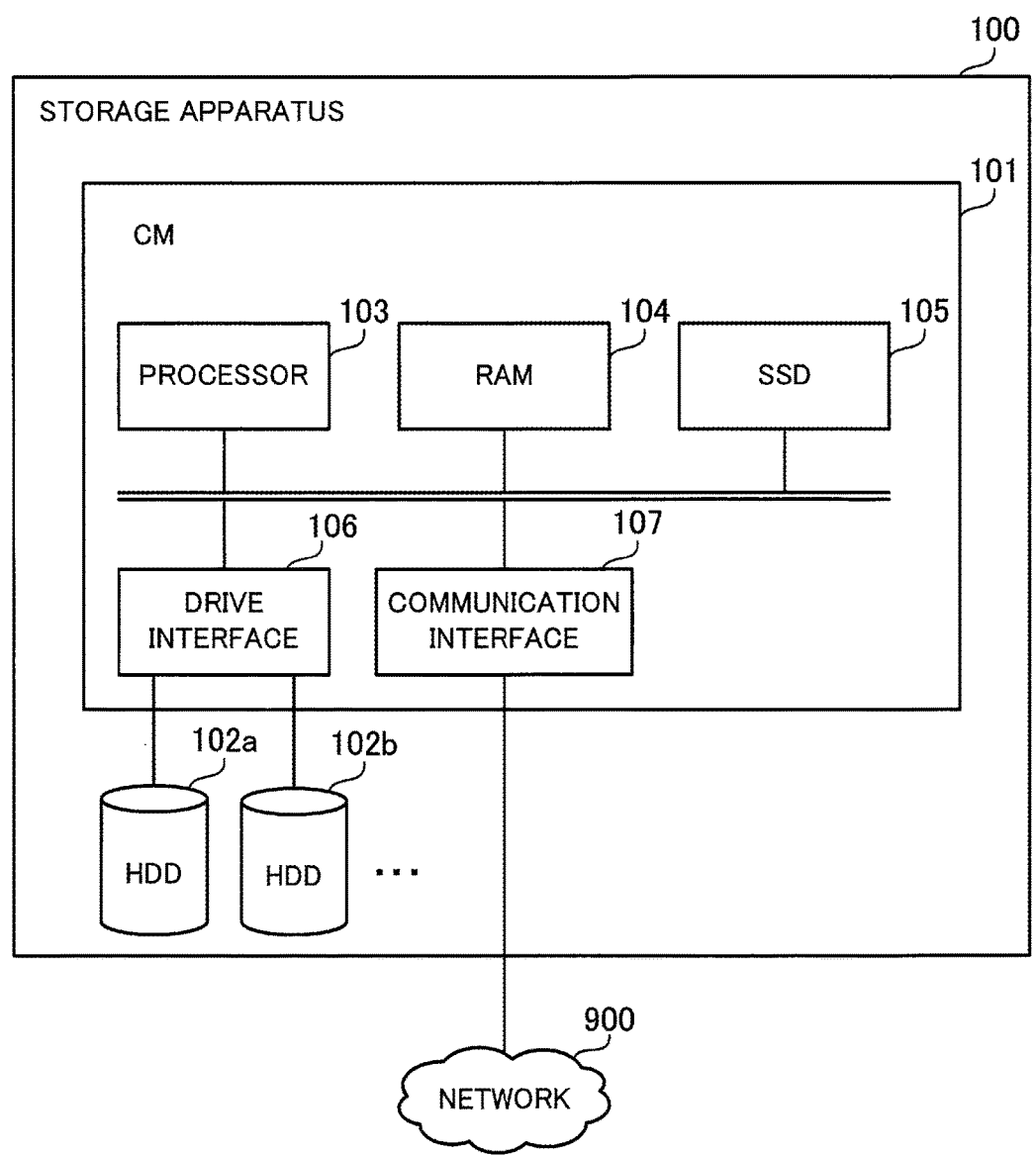
FIG. 5 illustrates an example of hardware of a storage apparatus.

FIG. 5 illustrates an example of hardware of the storage apparatus 100. The storage apparatus 100 includes a controller module (CM) 101 and HDDs 102a, 102b, and so on. Note that the storage apparatus 100 may include a plurality of controller modules, and may include one or more than two HDDs.

The controller module 101 includes a processor 103, a random access memory (RAM) 104, an SSD 105, a drive interface 106, and a communication interface 107. Each unit is connected to a bus.

The processor 103 controls information processing performed by the controller module 101. The processor 103 may be, for example, a central processing unit (CPU), a digital signal processor (DSP), an application specific integrated circuit (ASIC), a field programmable gate array (FPGA), or the like. The processor 103 may be a multiprocessor. Alternatively, the processor 103 may be a combination of two or more elements selected from CPU, DSP, ASIC, FPGA, and the like.

The RAM 104 is a primary storage device of the controller module 101. The RAM 104 temporarily stores at least part of the operating system (OS) program and application programs that are executed by the processor 103. The RAM 104 also stores various types of data used for processing by the processor 103.

The SSD 105 is a secondary storage device of the controller module 101. The SSD 105 is a non-volatile semiconductor memory. The SSD 105 stores the OS program, application programs, and various types of data. The controller module 101 may include an HDD as a secondary storage device, in place of the SSD 105.

The drive interface 106 is an interface for communicating with the HDDs 102a, 102b, and so on. The communication interface 107 is an interface for communicating with the operation management server 200 and the host server 400 via the network 900. In reality, a communication interface that connects to the operation management server 200 via a LAN or the like and a communication interface that connects to the host server 400 via a SAN or the like are provided separately.

Figure 6:
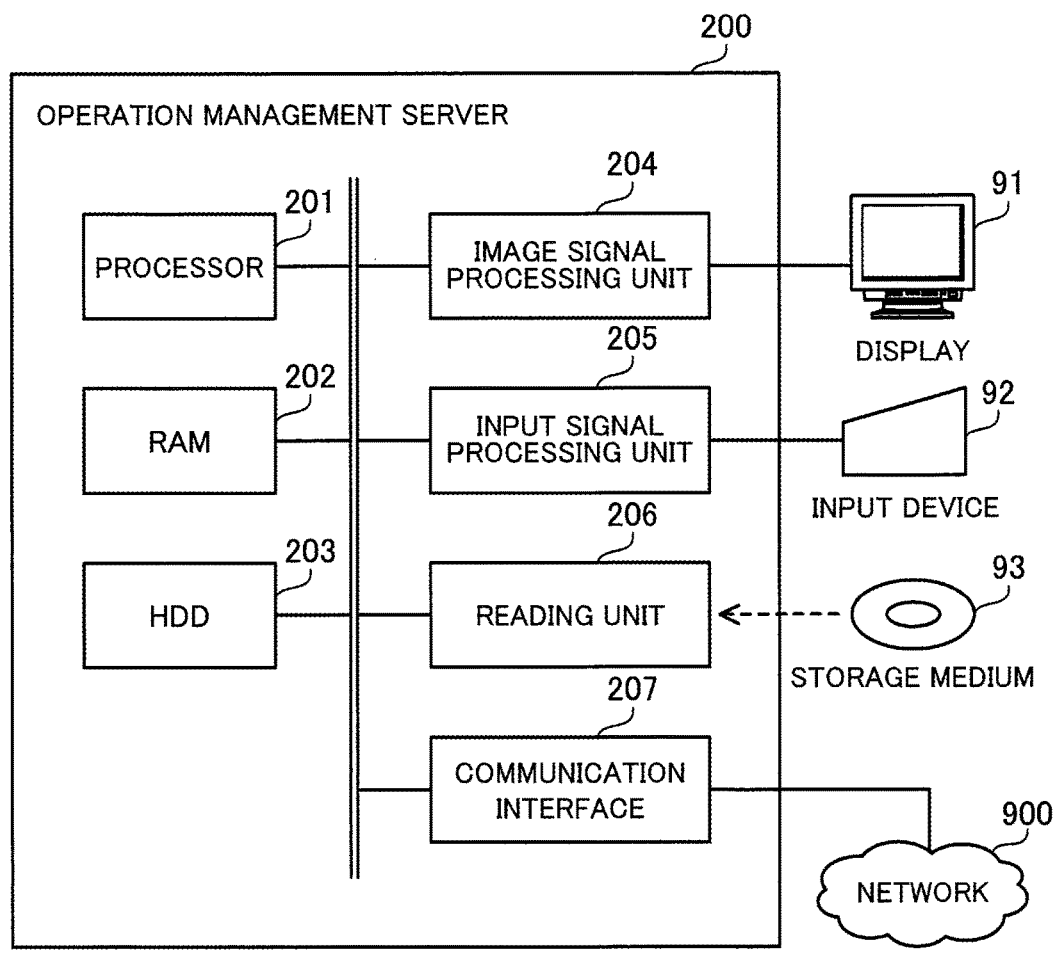
FIG. 6 illustrates an example of hardware of an operation management server.

FIG. 6 illustrates an example of hardware of the operation management server 200. The operation management server 200 includes a processor 201, a RAM 202, an HDD 203, an image signal processing unit 204, an input signal processing unit 205, a reading unit 206, and a communication interface 207.

The processor 201 may be a multiprocessor. The processor 201 may be, for example, a CPU, a DSP, an ASIC, an FPGA, or the like. Alternatively, the processor 201 may be a combination of two or more elements selected from CPU, DSP, ASIC, FPGA, and the like.

The RAM 202 is a primary storage device of the operation management server 200. The RAM 202 temporarily stores at least part of the OS program and application programs that are executed by the processor 201. The RAM 202 also stores various types of data used for processing by the processor 201.

The HDD 203 is a secondary storage device of the operation management server 200. The HDD 203 magnetically writes data to and reads data from an internal magnetic disk. The HDD 203 stores the OS program, application programs, and various types of data. The operation management server 200 may include other types of secondary storage devices such as a flash memory, an SSD, and the like, and may include a plurality of secondary storage devices.

The image signal processing unit 204 outputs an image to a display 91 connected to the operation management server 200, in accordance with an instruction from the processor 201. Examples of the display 91 include a cathode ray tube (CRT) display, a liquid crystal display, and the like.

The input signal processing unit 205 obtains an input signal from an input device 92 connected to the operation management server 200, and outputs the input signal to the processor 201. Examples of the input device include a pointing device (such as a mouse, a touch panel, and so on), a keyboard, and the like.

The reading unit 206 is a device that reads a program and data stored in a storage medium 93. Examples of the storage medium 93 include a magnetic disk (such as a flexible disk (FD), an HDD, and so on), an optical disc (such as a compact disc (CD), a digital versatile disc (DVD), and so on), a magneto-optical disc (MO), and the like. Examples of the storage medium 93 may also include a non-volatile semiconductor memory such as a flash memory card. The reading unit 206 reads a program and data from the storage medium 93, and stores the read program and data in the RAM 202 or the HDD 203, in accordance with an instruction from the processor 201, for example. Further, the processor 201 may instruct the operation management server 200 to store, in the RAM 202 or the HDD 203 of the operation management server 200, the program and data read from the storage medium 93.

The communication interface 207 communicates with the storage apparatus 100, the virtual machine management server 300, and the terminal apparatus 500 via the network 900.

Note that the virtual machine management server 300, the host server 400, and the terminal apparatus 500 may also be realized with the same hardware as that of the operation management server 200.

Figure 7:
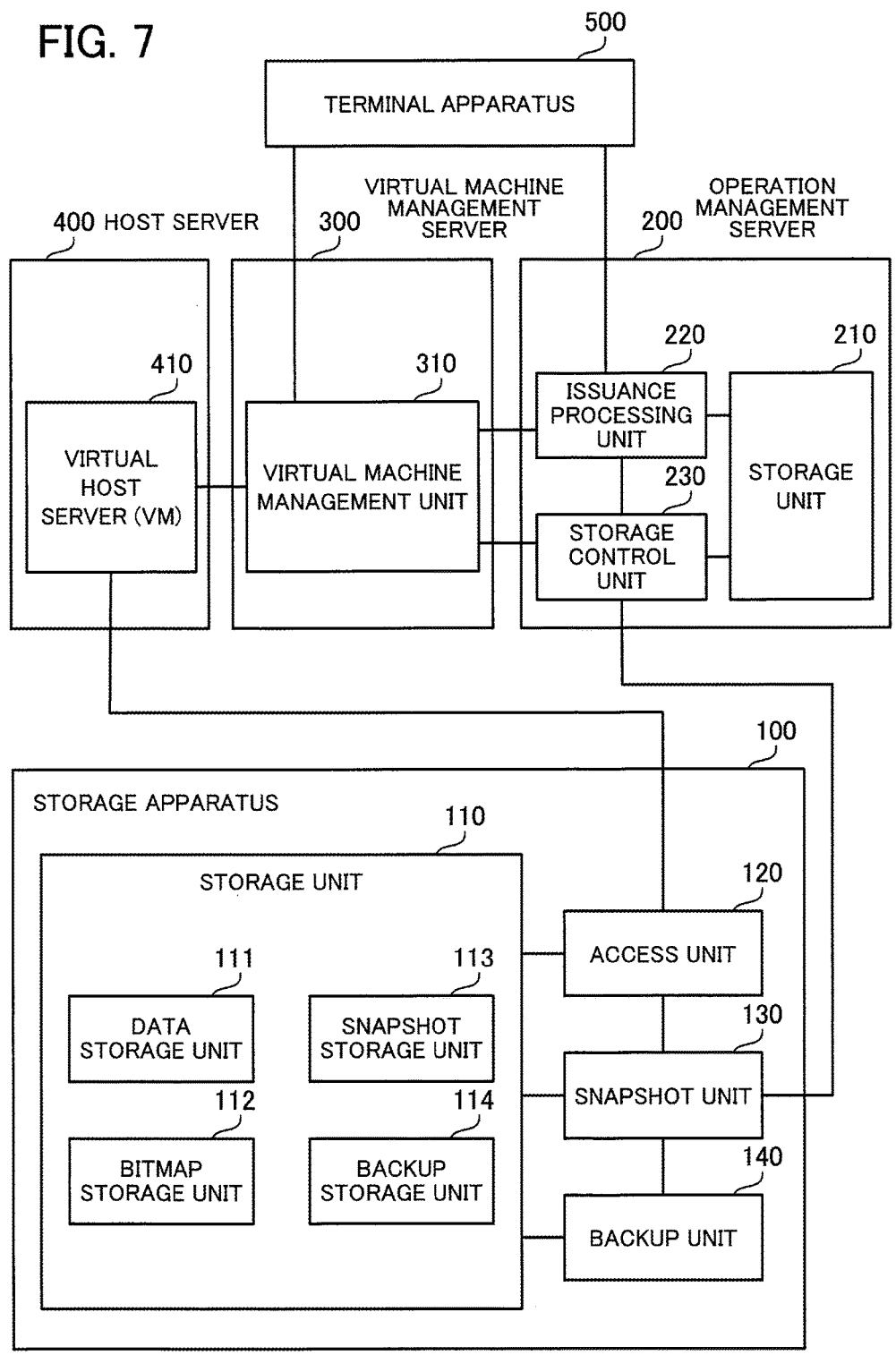
FIG. 7 illustrates an example of functions of the storage system.

FIG. 7 illustrates an example of functions of the storage system. The storage apparatus 100 includes a storage unit 110, an access unit 120, a snapshot unit 130, and a backup unit 140.

The storage unit 110 includes a data storage unit 111, a bitmap storage unit 112, a snapshot storage unit 113, and a backup storage unit 114. The data storage unit 111, the bitmap storage unit 112, the snapshot storage unit 113, and the backup storage unit 114 are implemented as storage areas reserved in the HDD 102a, 102b, and so on. One or more logical volumes are set in the storage areas where the data storage unit 111, the snapshot storage unit 113, and the backup storage unit 114 are implemented. Each logical volume is assigned a logical unit number (LUN).

The data storage unit 111 stores user data used for processing by the host server 400. More specifically, the logical volume of the data storage unit 111 stores information on a virtual host server 410 (described below). The virtual host server 410 is a virtual machine that operates on the host server 400. The information on the virtual host server 410 is the information for realizing the virtual machine described above. For example, the information on the virtual host server 410 includes information on the configuration of the virtual host server 410, information on the content of a virtual disk provided in the virtual host server 410, information on the content of a virtual memory provided in the virtual host server 410.

The bitmap storage unit 112 stores a bitmap indicating the location of data that is updated in a logical volume during a period from one execution of a backup process of the logical volume by the backup unit 140 to the next execution of a backup process of the same logical volume. The bitmap storage unit 112 stores a bitmap for each logical volume of the data storage unit 111.

The snapshot storage unit 113 stores data of a bitmap for the logical volume of the data storage unit 111. The backup storage unit 114 stores backup data corresponding to the data in the logical volume of the data storage unit 111.

The access unit 120, the snapshot unit 130, and the backup unit 140 are implemented as modules of a program executed by the processor 103, for example.

The access unit 120 receives from the host server 400 an access request specifying an LUN of a logical volume that is set in the data storage unit 111 and a logical block address (LBA) in the logical volume. The access unit 120 accesses data stored in the logical volume of the data storage unit 111, in response to the access request. For example, the access unit 120 updates the data stored in the logical volume of the data storage unit 111, in response to a write request from the host server 400. Then, the access unit 120 updates the bitmap in the bitmap storage unit 112 corresponding to the logical volume. Since the access unit 120 updates the bitmap, the backup unit 140 is able to specify the location of the updated data as will be described below.

The snapshot unit 130 creates a snapshot of the logical volume that is set in the data storage unit 111, in response to a snapshot creation request from the operation management server 200. The snapshot creation process is performed using the copy-on-write scheme as described in FIG. 2. Upon receiving the snapshot creation instruction, the snapshot unit 130 creates a volume for a snapshot in the snapshot storage unit 113, and stores data on the snapshot in the volume.

The backup unit 140 backs up, into the backup volume created in the backup storage unit 114, data of the logical volume that is the subject of the snapshot creation instruction to the snapshot unit 130 from the operation management server 200. Thus, when an instruction to create a snapshot is issued from the operation management server 200, a backup process is executed along with a snapshot creation process. However, as will be described below, there are cases in which only a snapshot creation process is executed in accordance with a copy flag transmitted together with a snapshot creation instruction.

Further, upon executing a backup process, the backup unit 140 refers to a bitmap in the bitmap storage unit 112 corresponding to a logical volume to be backed up. Thus, the backup unit 140 executes a differential backup process for backing up, in the backup volume, only the data that is updated in the logical volume after the previous backup process. That is, the backup unit 140 specifies differential data that is updated in the logical volume, based on the bitmap, reads the specified differential data from the logical volume, and updates data at the corresponding position in the backup volume with the differential data.

The operation management server 200 includes a storage unit 210, an issuance processing unit 220, and a storage control unit 230. The storage unit 210 is implemented as a storage area reserved in the RAM 202 or the HDD 203, for example. The storage unit 210 includes a management table. In the management table, information for determining whether to cause the storage apparatus 100 to execute a differential backup process is registered. Further, the storage unit 210 stores information on the virtual host server 410.

The issuance processing unit 220 and the storage control unit 230 are implemented as modules of a program executed by the processor 201, for example.

The issuance processing unit 220 receives from the terminal apparatus 500 a backup request of the virtual host server 410 that operates on the host server 400. Upon receiving the backup request, the issuance processing unit 220 registers, in the management table, information indicating that a backup process is to be executed. Further, the issuance processing unit 220 instructs the virtual machine management server 300 to create a snapshot of the virtual host server 410 that is requested to be backed up, and also instructs the virtual machine management server 300 to ensure consistency. Ensuring consistency is a process of stopping the operation of the virtual host server 410 so as to accurately back up data in the logical volume corresponding to the virtual host server 410 at the time when the storage apparatus 100 is instructed to create a snapshot.

The storage control unit 230 provides an interface that allows the virtual machine management server 300 to transparently control the storage apparatus 100. An application program that realizes processing performed by the storage control unit 230 is provided by a vendor of the storage apparatus 100. In this case, the virtual machine management server 300 is able to control the operation of the storage apparatus 100, using the interface provided by the storage control unit 230, regardless of by which vendor the storage apparatus 100 is provided.

In this embodiment, upon receiving a request to create a snapshot of a logical volume in the storage apparatus 100 from the virtual machine management server 300, the storage control unit 230 instructs the storage apparatus 100 to create a snapshot of the logical volume. At this point, the storage control unit 230 determines whether to cause the storage apparatus 100 to execute a differential backup process of the logical volume along with a snapshot creation process, based on information registered in the management table of the storage unit 210. The storage control unit 230 transmits the value of a flag corresponding to the determination result together with the snapshot creation instruction, thereby controlling whether to cause the storage apparatus 100 to execute a differential backup process of the logical volume.

The virtual machine management server 300 includes a virtual machine management unit 310. The virtual machine management unit 310 manages the operation of the virtual host server 410. For example, the virtual machine management unit 310 manages the resources to be assigned to the virtual host server 410, and controls start and stop of the operation of the virtual host server 410. Further, in the case where there are a plurality of host servers 400, the virtual machine management unit 310 is able to change the host server 400 that operates the virtual host server 410.

Further, the virtual machine management unit 310 receives a request to create a snapshot of the virtual host server 410, from the terminal apparatus 500 or the issuance processing unit 220 of the operation management server 200. Then, the virtual machine management unit 310 stops the operation of the virtual host server 410 so as to ensure the consistency, and then instructs the storage control unit 230 to create a snapshot of the logical volume storing the information for realizing the virtual host server 410.

The host server 400 operates the virtual host server 410 as a virtual machine in the host server 400, under the control of the virtual machine management unit 310. As mentioned above, the information for realizing the virtual host server 410 is stored in the logical volume of the data storage unit 111. The host server 400 acquires the information for realizing the virtual host server 410 from the logical volume, thereby operating the virtual host server 410. Further, upon updating the information for realizing the virtual host server 410, the host server 400 accesses the storage apparatus 100 so as to reflect the update to the logical volume of the data storage unit 111.

Note that the information for realizing the virtual host server 410, which is stored in the logical volume, includes virtual disk content information and virtual memory content information. Based on the virtual disk content information, a logical volume storing the content information is assigned as a storage area of a virtual disk of the virtual host server 410. Based on the virtual memory content information, a logical volume storing the content information is assigned as a storage area of a virtual memory of the virtual host server 410. Thus, it is possible to assign the virtual memory and the virtual disk with a capacity greater than the capacity of the storage area of the host server 400.

Further, the virtual host server 410 specifies the LUN and the LBA of a logical volume, and accesses the data storage unit 111 of the storage apparatus 100. Further, if an instruction to stop the operation of the virtual host server 410 is received from the virtual machine management server 300, the virtual host server 410 stops the operation of the virtual host server 410.

Figure 8:
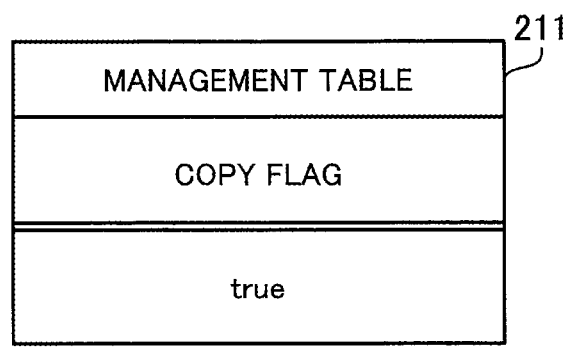
FIG. 8 illustrates an example of a management table.

FIG. 8 illustrates an example of a management table 211. The management table 211 is stored in the storage unit 210 of the operation management server 200. The management table 211 includes a "copy flag" field. In the "copy flag" field, information indicating to perform a differential backup process (true) or information indicating not to perform a differential backup process (false) is registered.

Upon receiving a backup request of the virtual host server 410 from the terminal apparatus 500, the issuance processing unit 220 of the operation management server 200 updates the copy flag in the management table 211 from "false" to "true". Further, upon receiving an instruction to create a snapshot of a logical volume from the virtual machine management unit 310 of the virtual machine management server 300, the storage control unit 230 of the operation management server 200 reads the copy flag in the management table 211. Then, the storage control unit 230 transmits an instruction to create a snapshot of the logical volume to the storage apparatus 100, and also transmits information on the read copy flag to the storage apparatus 100. The snapshot unit 130 of the storage apparatus 100 determines whether to cause the backup unit 140 to execute a differential backup process along with a snapshot creation process.

In the case where the instruction to create a snapshot of the virtual host server 410 is transmitted directly to the virtual machine management server 300 from the terminal apparatus 500, the copy flag in the management table 211 remains "false". In this case, the storage apparatus 100 executes only a snapshot creation process, and does not execute a differential backup process. In this manner, based on whether a request for backup of the virtual host server 410 is issued to the operation management server 200 or a request for creation of a snapshot of the virtual host server 410 is issued to the virtual machine management server 300, whether to execute a differential backup process of the corresponding logical volume is controlled, by using the copy flag in the management table 211.

Next, operations performed in the storage system will be briefly described with reference to a specific example.

Figure 9:
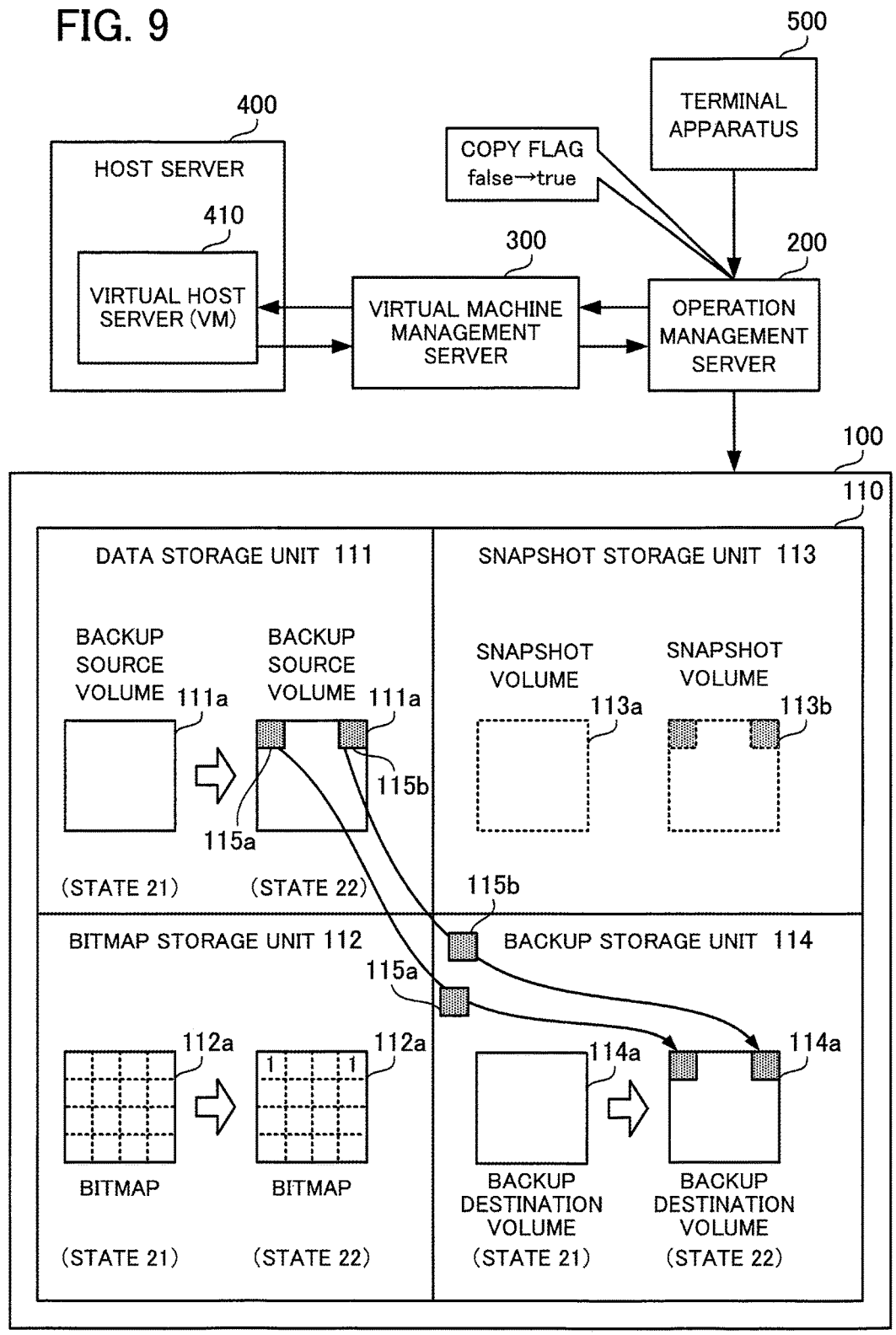
FIG. 9 illustrates a specific example of the case in which both a snapshot creation process and a differential backup process are executed.

FIG. 9 illustrates a specific example of the case in which both a snapshot creation process and a differential backup process are executed. In the data storage unit 111, a backup source volume 111a is set as an example of the logical volume storing the information for realizing the virtual host server 410.

A "state 21" of FIG. 9 is a state in which the operation of the virtual host server 410 is stopped, and a snapshot creation process and a differential backup process of the backup source volume 111a are executed. In the "state 21", a snapshot volume 113a is created in the snapshot storage unit 113, as data of the snapshot of the backup source volume 111a. Since the snapshot creation process is performed using the copy-on-write scheme, the actual data in the backup source volume 111a is not stored in the snapshot volume 113a in the "state 21".

Further, a backup destination volume 114a is created in the backup storage unit 114, and all the data in the backup source volume 111a is copied to the backup destination volume 114a. Further, a bitmap 112a corresponding to the backup source volume 111a is stored in the bitmap storage unit 112. The bitmap 112a has an entry for each of the sub-areas of the backup source volume 111a. When all the data in the backup source volume 111a is copied to the backup destination volume 114a, 0 is stored in all the entries of the bitmap 112a. Note that although not illustrated in FIG. 9, 0 is registered in each of the empty entries of the bitmap 112a.

When the operation stop of the virtual host server 410 is cancelled, the above "state 21" is shifted to a state in which update of the backup source volume 111a by the virtual host server 410 is allowed.

Note that a process of copying all the data in the backup source volume 111a to the backup destination volume 114a may be executed in the background in the state in which the operation stop of the virtual host server 410 is cancelled. In this case, if a certain partial area in the backup source volume 111a is updated for the first time before completion of the copy process, the storage apparatus 100 copies the original data stored in the partial area to the backup destination volume 114a, and then updates the partial area with new data. With these operations, it is possible to reduce the time during which the operation of the virtual host server 410 is stopped.

It is assumed that after the above "state 21", data 115a and data 115b in the backup source volume 111a are updated. In this case, the entries of the bitmap 112a corresponding to the respective storage areas of the data 115a and data 115b are updated from 0 to 1 by the access unit 120. Further, although not illustrated, the original data before the update corresponding to each of the data 115a and data 115b is stored in the snapshot volume 113a. In FIG. 9, this state is illustrated as a "state 22". Then, in the "state 22", when the terminal apparatus 500 transmits to the operation management server 200 a backup request command specifying the virtual host server 410, the following operations are executed.

The operation management server 200 updates the copy flag in the management table 211 from "false" to "true". Further, the operation management server 200 transmits a request to create a snapshot of the virtual host server 410 to the virtual machine management server 300, together with a request to ensure consistency. The virtual machine management server 300 stops the operation of the virtual host server 410. Thus, access to the backup source volume 111a by the virtual host server 410 is stopped. The virtual machine management server 300 instructs the storage apparatus 100 to create a snapshot of the backup source volume 111a, via the operation management server 200. In this step, the operation management server 200 transmits information on the copy flag in the management table 211 to the storage apparatus 100, together with the snapshot creation request.

Upon receiving the snapshot creation request, the storage apparatus 100 performs a snapshot creation process of the backup source volume 111a. More specifically, the storage apparatus 100 creates a snapshot volume 113b. However, as in the case of the snapshot volume 113a, the actual data in the backup source volume 111a is not stored in the snapshot volume 113b.

Further, since the copy flag received from the operation management server 200 is "true", the storage apparatus 100 executes a differential backup process of the backup source volume 111a, along with the snapshot creation process. In the differential backup process, the storage apparatus 100 refers to the bitmap 112a so as to specify sub-areas that are updated in the backup source volume 111a. The storage apparatus 100 reads the data 115a and data 115b from the specified sub-areas, and overwrites data at the corresponding positions in the backup destination volume 114a with the data 115a and data 115b. Upon completion of the overwriting with the data 115a and data 115b, the storage apparatus 100 updates all the entries of the bitmap 112a to 0. Note that when these operations are completed, the copy flag of the management table 211 is updated from "true" to "false".

According to the operations described above, a snapshot creation process and a differential backup process of the backup source volume 111a are executed while the operation of the virtual host server 410 is stopped. Thus, the content of the backup source volume 111a at the time of reception of the snapshot creation instruction is surely backed up in the backup destination volume 114a, so that the consistency between the backup destination volume 114a and the snapshot volume 113b is ensured.

Further, since only the updated data is copied from the backup source volume 111a to the backup destination volume 114a, the processing load on the storage apparatus 100 during execution of a backup process is reduced. Thus, it is possible to prevent a reduction in the performance of other operations (for example, the performance in accessing another logical volume in the data storage unit 111 from another apparatus) in the storage apparatus 100. Further, since the time taken to complete a backup process is reduced, it is possible to reduce the time during which the operation of the virtual host server 410 is stopped. Further, the backup process is executed based on the backup source volume 111a instead of the snapshot volume 113b, it is possible to easily realize a differential backup process by using existing processing functions.

Figure 10:
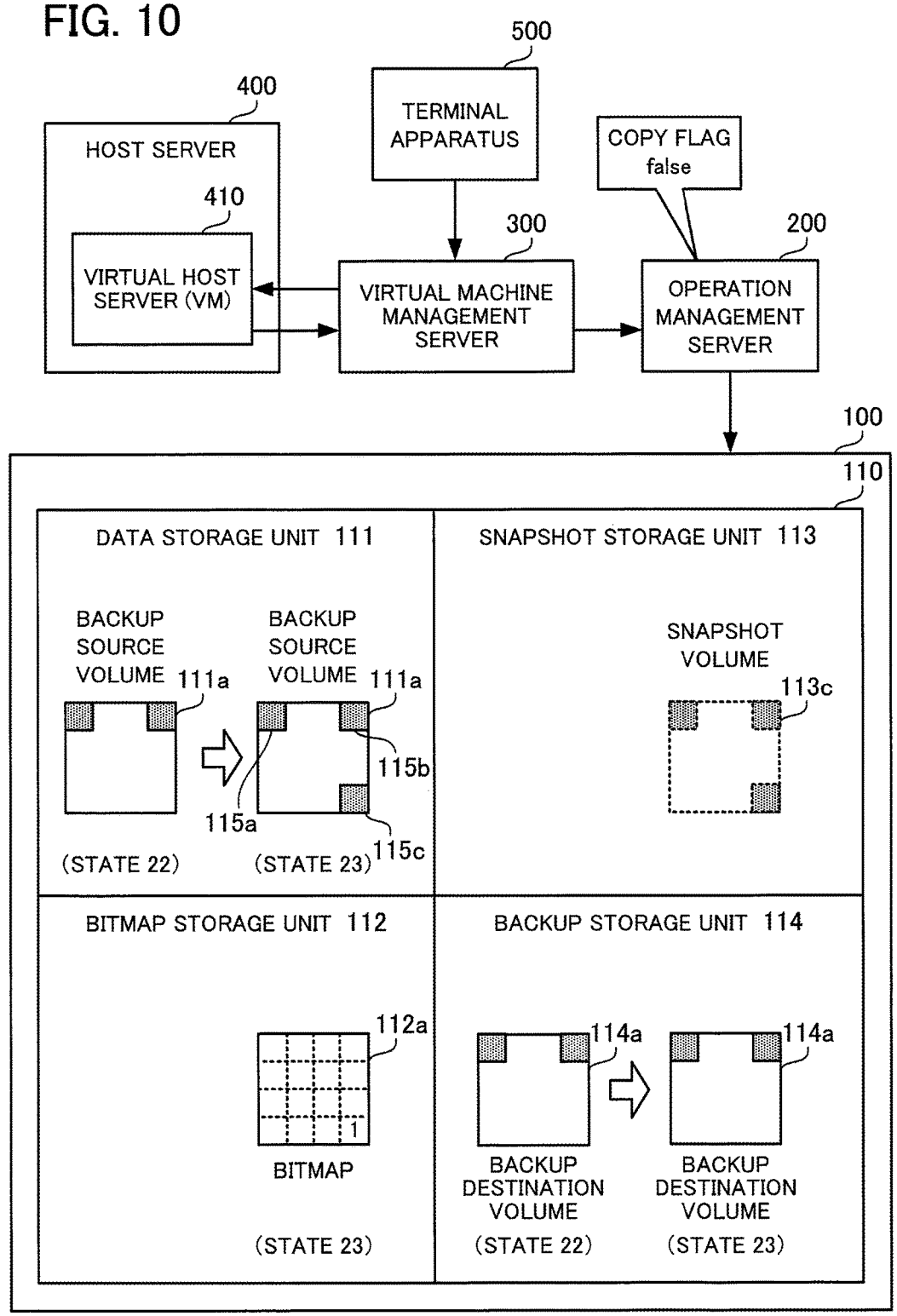
FIG. 10 illustrates a specific example of the case in which only a snapshot creation process is executed.

FIG. 10 illustrates a specific example of the case in which only a snapshot creation process is executed. In FIG. 10, it is assumed, for example, that after a snapshot creation process and a differential backup process are executed in the "state 22" of FIG. 9, the operation stop of the virtual host server 410 is cancelled, and data 115c is updated in the backup source volume 111a. In FIG. 10, this state is illustrated as a "state 23". In the "state 23", the entry corresponding to the data 115c in the bitmap 112a is updated to 1. Then, in the "state 23", when the terminal apparatus 500 transmits to the virtual machine management server 300 a snapshot request command specifying the virtual host server 410, the following operations are executed.

The virtual machine management server 300 stops the operation of the virtual host server 410. Thus, access to the backup source volume 111a by the virtual host server 410 is stopped. The virtual machine management server 300 instructs the storage apparatus 100 to create a snapshot of the backup source volume 111a, via the operation management server 200. In this step, the operation management server 200 transmits information on the copy flag in the management table 211 to the storage apparatus 100, together with the snapshot creation request.

Upon receiving the snapshot creation request, the storage apparatus 100 performs a snapshot creation process of the backup source volume 111a. More specifically, the storage apparatus 100 creates a snapshot volume 113c. However, as in the case of the snapshot volumes 113a and 113b, the actual data in the backup source volume 111a is not stored in the snapshot volume 113c. Note that in FIG. 10, the snapshot volumes 113a and 113b are not illustrated.

Further, since the copy flag received from the operation management server 200 is "false", the storage apparatus 100 does not execute a differential backup process of the backup source volume 111a. The storage apparatus 100 notifies the operation management server 200 of the completion of the process, without updating the bitmap 112a.

As described with reference to the specific examples of FIGS. 9 and 10, in the case where a backup request is transmitted from the terminal apparatus 500 to the operation management server 200, the storage apparatus 100 executes both a snapshot creation process and a differential backup process. Further, in the case where a snapshot creation request is transmitted from the terminal apparatus 500 to the virtual machine management server 300, the storage apparatus 100 executes only a snapshot creation process. In this manner, by using a copy flag, the operation management server 200 is able to control whether to cause the storage apparatus 100 to execute a differential backup process along with a snapshot creation process.

The operation management server 200 is a server that manages the operation of the apparatuses included in the storage system. The operation management server 200 has, as one of its management functions, a function of causing the storage apparatus 100 to execute a backup of a logical volume. Therefore, in the case where the user requests the operation management server 200 to back up the virtual host server 410, a determination is made that not only creation of a snapshot of the virtual host server 410 but also backup of the actual data corresponding to the snapshot is requested.

On the other hand, the virtual machine management server 300 is a server that manages the operation of the virtual host server 410. The function of creating a snapshot of the virtual host server 410 provided by the virtual machine management server 300 is not designed for backing up the actual data of a snapshot. Therefore, in the case where the user requests the virtual machine management server 300 to create a snapshot of the virtual host server 410, a determination is made that backup of the actual data of the snapshot is not requested.

Accordingly, as described above, since whether to execute a differential backup process of a corresponding logical volume is controlled based on which of the operation management server 200 and the virtual machine management server 300 a request from the user is input to, appropriate processing in accordance with the intention of the user is executed.

Next, a description will be given of processing by the storage apparatus 100 and the operation management server 200 in detail with reference to FIGS. 11 and 12.

Figure 11:
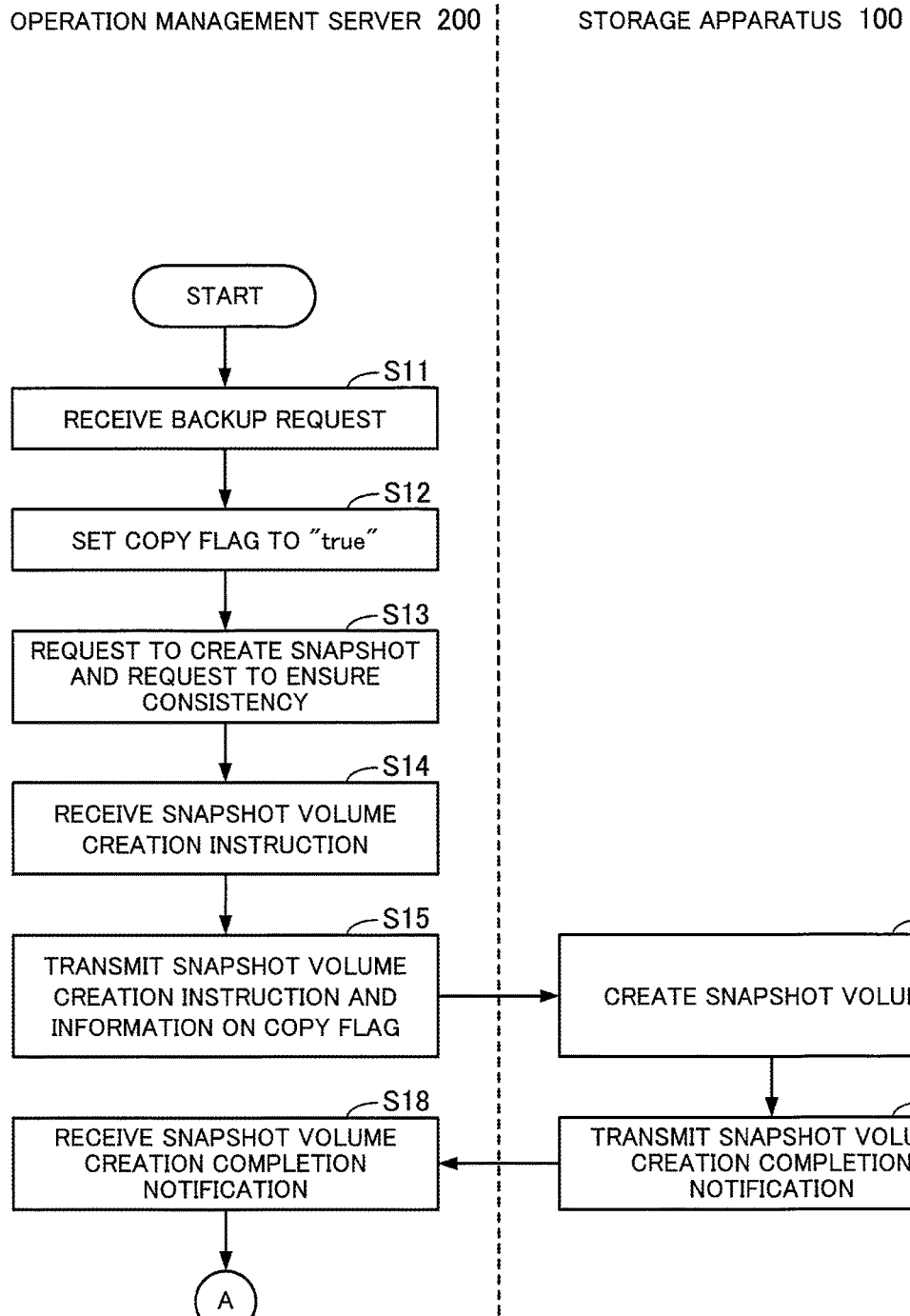
FIG. 11 is a flowchart (part 1) illustrating an example of a process performed by the storage apparatus and the operation management server.

FIG. 11 is a flowchart (part 1) illustrating an example of a process performed by the storage apparatus 100 and the operation management server 200. In the following, the process illustrated in FIG. 11 will be described in order of step number.

(S11) The issuance processing unit 220 receives a backup request specifying the identification information of the virtual host server 410 from the terminal apparatus 500.

(S12) The issuance processing unit 220 sets the copy flag in the management table 211 to "true".

(S13) The issuance processing unit 220 transmits a request to create a snapshot of the virtual host server 410 to the virtual machine management unit 310, together with a request to ensure consistency.

(S14) The storage control unit 230 receives a snapshot volume creation instruction from the virtual machine management unit 310.

(S15) The storage control unit 230 transmits the snapshot volume creation instruction and information on the copy flag in the management table 211 to the snapshot unit 130.

(S16) The snapshot unit 130 receives the snapshot volume creation instruction and the information on the copy flag in the management table 211. Then, the snapshot unit 130 creates a snapshot volume in the snapshot storage unit 113.

(S17) The snapshot unit 130 transmits a snapshot volume creation completion notification to the storage control unit 230.

(S18) The storage control unit 230 receives the snapshot volume creation completion notification. The storage control unit 230 transmits the snapshot volume creation completion notification to the virtual machine management unit 310. Then, the process proceeds to step S21.

Figure 12:
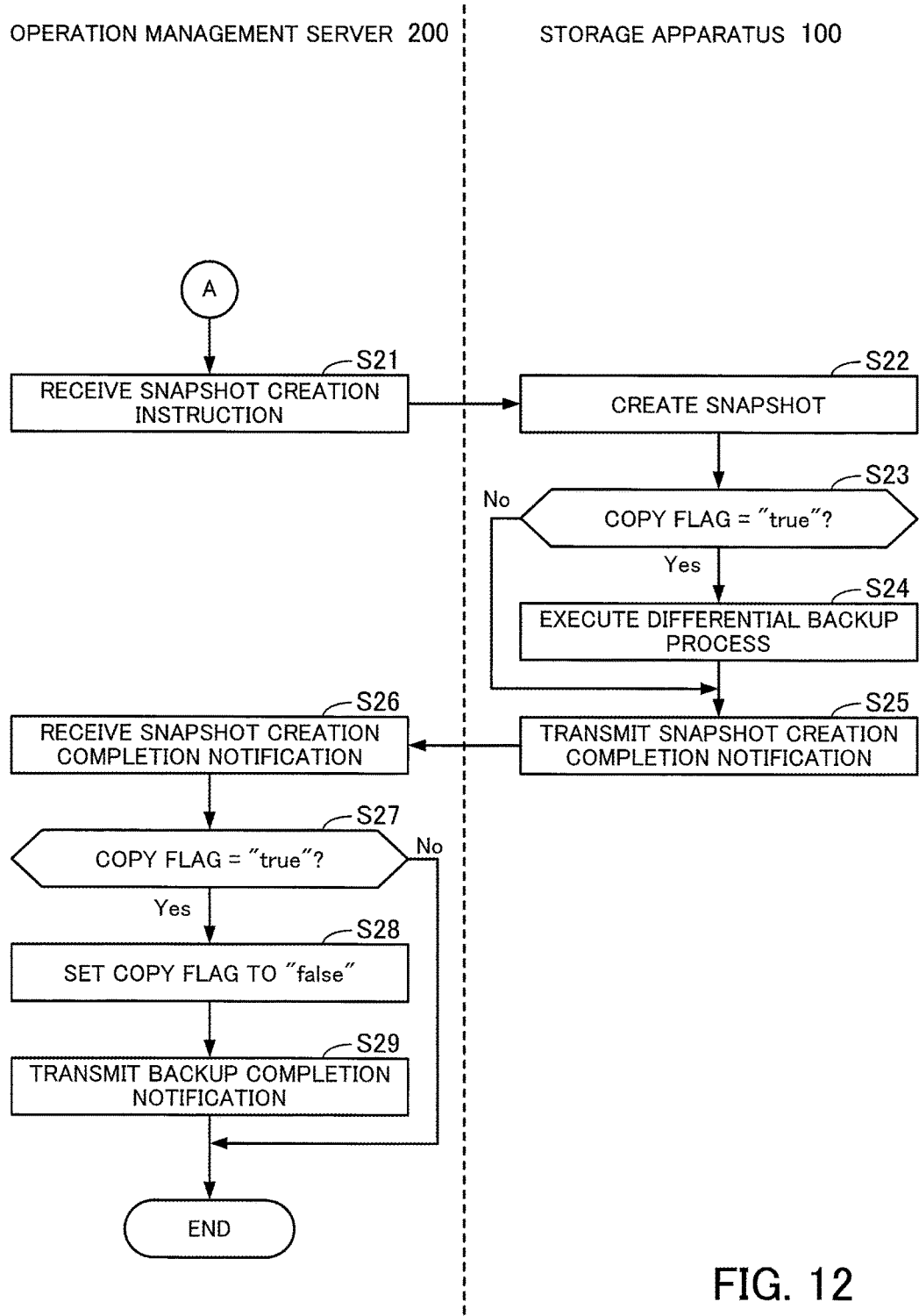
FIG. 12 is a flowchart (part 2) illustrating the example of the process performed by the storage apparatus and the operation management server.

FIG. 12 is a flowchart (part 2) illustrating the example of the process performed by the storage apparatus 100 and the operation management server 200. In the following, the process illustrated in FIG. 12 will be described in order of step number.

(S21) The storage control unit 230 receives a snapshot creation instruction specifying the LUN of a logical volume from the virtual machine management unit 310. The specified logical volume is hereinafter referred to as a "logical volume of interest". The storage control unit 230 transmits an instruction to create a snapshot of the logical volume of interest to the snapshot unit 130.

(S22) The snapshot unit 130 creates a snapshot of data stored in the logical volume of interest. At this point, the snapshot unit 130 stores, in the snapshot volume created in step S17, management information such as a pointer or the like indicating the data in the logical volume of interest.

(S23) The snapshot unit 130 determines whether the copy flag received in step S17 is "true". If the copy flag is "true", the snapshot unit 130 instructs the backup unit 140 to perform a differential backup process. Then, the process proceeds to step S24. If the copy flag is "false", the process proceeds to step S25.

(S24) The backup unit 140 performs a differential backup process of the specified logical volume.

More specifically, the backup unit 140 refers to the backup storage unit 114, and creates a backup volume corresponding to the specified logical volume in the backup storage unit 114 if the current backup process is the first backup process, that is, if a backup is performed for the first time. The backup unit 140 stores all the data stored in the logical volume of interest in the backup volume. Further, the backup unit 140 creates a bitmap corresponding to the specified logical volume in the bitmap storage unit 112, and registers 0 in all the entries of the bitmap.

On the other hand, the backup unit 140 refers to the backup storage unit 114, and refers to the bitmap in the bitmap storage unit 112 corresponding to the logical volume of interest if backup data of the logical volume of interest exits, that is, if the current backup process is the second or subsequent backup process. Then, the backup unit 140 specifies differential data, which is data updated during a period from the execution of the previous differential backup process to the execution of the current differential backup process. The backup unit 140 copies the differential data specified in the logical volume of interest, and overwrites data in the corresponding area of the backup volume with the differential data. The backup unit 140 initializes all the entries of the bitmap in the bitmap storage unit 112 to 0. The backup unit 140 notifies the snapshot unit 130 of the completion of the differential backup process.

(S25) The snapshot unit 130 transmits a snapshot creation completion notification to the storage control unit 230.

(S26) The storage control unit 230 receives the snapshot creation completion notification. The storage control unit 230 transmits the snapshot creation completion notification to the virtual machine management unit 310.

(S27) The storage control unit 230 refers to the management table 211 so as to determine whether the copy flag is "true". If the copy flag is "true", the process proceeds to step S28. If the copy flag is "false", the process ends.

(S28) The storage control unit 230 sets the copy flag in the management table 211 to "false". The storage control unit 230 transmits to the issuance processing unit 220 information indicating that the flag is changed.

(S29) The issuance processing unit 220 transmits a backup completion notification to the terminal apparatus 500. Then, the process ends.

Note that in step S24, the backup unit 140 refers to the bitmap in the bitmap storage unit 112, and does not overwrite the backup data of the logical volume of interest stored in the backup storage unit 114 if the data in the logical volume of interest is not updated.

Next, a description will be given of the processing flow of the entire storage system with reference to a sequence diagram.

Figure 13:
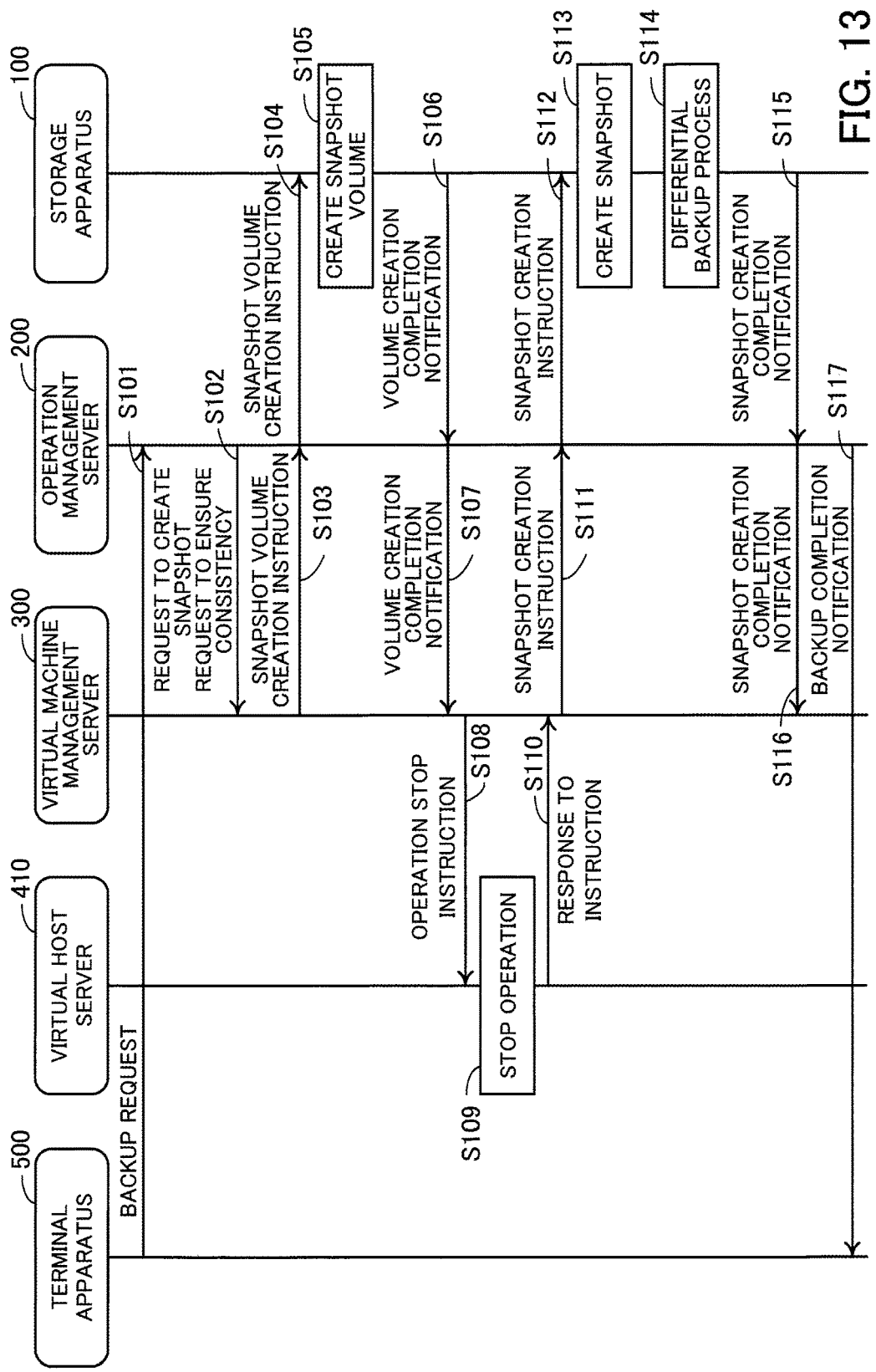
FIG. 13 is a sequence diagram illustrating the case in which both a snapshot creation process and a differential backup process are executed.

FIG. 13 is a sequence diagram illustrating the case in which both a snapshot creation process and a differential backup process are executed. In the following, the process illustrated in FIG. 13 will be described in order of step number.

(S101) The terminal apparatus 500 transmits a backup request specifying the identification information of the virtual host server 410 to the operation management server 200.

(S102) The issuance processing unit 220 of the operation management server 200 sets the copy flag in the management table 211 to "true". Further, the issuance processing unit 220 transmits a request to create a snapshot of the specified virtual host server 410 to the virtual machine management server 300, together with a request to ensure consistency.

(S103) The virtual machine management unit 310 of the virtual machine management server 300 transmits a snapshot volume creation instruction to the operation management server 200.

(S104) The storage control unit 230 of the operation management server 200 transmits the snapshot volume creation instruction to the storage apparatus 100, together with the copy flag in the management table 211.

(S105) The snapshot unit 130 of the storage apparatus 100 creates a snapshot volume.

(S106) The snapshot unit 130 of the storage apparatus 100 transmits a snapshot volume creation completion notification to the operation management server 200.

(S107) The storage control unit 230 of the operation management server 200 transmits the snapshot volume creation completion notification to the virtual machine management server 300.

(S108) The virtual machine management unit 310 of the virtual machine management server 300 instructs the virtual host server 410 to stop operating.

(S109) The virtual host server 410 stops operating. Note that in reality, the virtual host server 410 reflects updated data among the data for realizing the virtual host server 410, which is read from the data storage unit 111, to the corresponding logical volume in the data storage unit 111, and then stops operating.

(S110) The host server 400 transmits information indicating the operation of the virtual host server 410 is stopped to the virtual machine management server 300.

(S111) The virtual machine management server 300 specifies the logical volume storing the data for realizing the virtual host server 410. The virtual machine management server 300 instructs the operation management server 200 to create a snapshot of the specified logical volume.

As mentioned above, since there are a plurality of logical volumes corresponding to the data for realizing the virtual host server 410, the virtual machine management server 300 indicates creation of a snapshot of each of the logical volumes. In the following description, for simplicity of explanation, it is assumed that creation of a snapshot of only one logical volume is indicated. The logical volume that is the subject of the snapshot creation instruction is referred to as a "logical volume of interest".

(S112) The storage control unit 230 of the operation management server 200 instructs the storage apparatus 100 to create a snapshot of the logical volume of interest.

(S113) The snapshot unit 130 of the storage apparatus 100 creates a snapshot of the logical volume of interest.

(S114) Since the copy flag transmitted in step S104 is "true", the backup unit 140 of the storage apparatus 100 executes a differential backup process of the logical volume of interest.

(S115) The snapshot unit 130 of the storage apparatus 100 transmits a snapshot creation completion notification to the operation management server 200.

(S116) The storage control unit 230 of the operation management server 200 transmits the snapshot creation completion notification to the virtual machine management server 300. Further, the storage control unit 230 sets the copy flag in the management table 211 to "false".

(S117) The issuance processing unit 220 of the operation management server 200 transmits a backup completion notification to the terminal apparatus 500.

Figure 14:
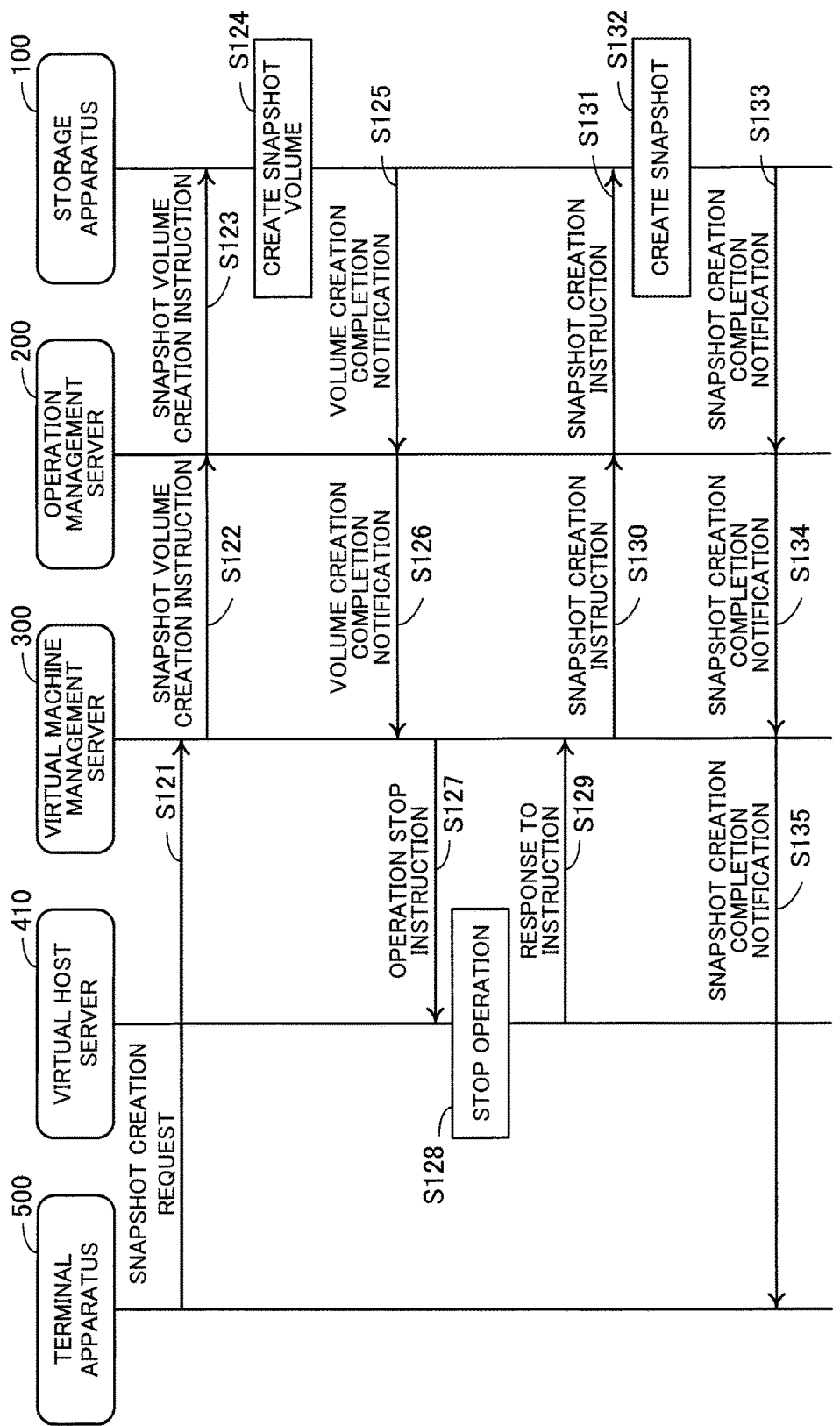
FIG. 14 is a sequence diagram illustrating the case in which only a snapshot creation process is executed.

FIG. 14 is a sequence diagram illustrating the case in which only a snapshot creation process is executed. In the following, the process illustrated in FIG. 14 will be described in order of step number.

(S121) The terminal apparatus 500 transmits a snapshot creation request specifying the identification information of the virtual host server 410 to the virtual machine management server 300.

(S122) The virtual machine management unit 310 of the virtual machine management server 300 transmits a snapshot volume creation instruction to the operation management server 200.

(S123) The storage control unit 230 of the operation management server 200 transmits the snapshot volume creation instruction to the storage apparatus 100, together with the copy flag in the management table 211.

(S124) The snapshot unit 130 of the storage apparatus 100 creates a snapshot volume.

(S125) The snapshot unit 130 of the storage apparatus 100 transmits a snapshot volume creation completion notification to the operation management server 200.

(S126) The storage control unit 230 of the operation management server 200 transmits the snapshot volume creation completion notification to the virtual machine management server 300.

(S127) The virtual machine management unit 310 of the virtual machine management server 300 instructs the virtual host server 410 to stop operating.

(S128) The virtual host server 410 stops operating.

(S129) The host server 400 transmits information indicating the operation of the virtual host server 410 is stopped to the virtual machine management server 300.

(S130) The virtual machine management unit 310 of the virtual machine management server 300 specifies a logical volume storing the data for realizing the virtual host server 410. The virtual machine management server 300 instructs the operation management server 200 to create a snapshot of the specified logical volume. As in the case of step S111 of FIG. 13, for simplicity of explanation, it is assumed here that creation of a snapshot of only one logical volume is indicated.

(S131) The storage control unit 230 of the operation management server 200 instructs the storage apparatus 100 to create a snapshot of the logical volume of interest.

(S132) The snapshot unit 130 of the storage apparatus 100 creates a snapshot of the logical volume of interest.

(S133) Since the copy flag transmitted in step S123 is "false", the snapshot unit 130 of the storage apparatus 100 transmits a snapshot creation completion notification to the operation management server 200.

(S134) The storage control unit 230 of the operation management server 200 transmits the snapshot creation completion notification to the virtual machine management server 300.

(S135) The virtual machine management unit 310 of the virtual machine management server 300 transmits the snapshot creation completion notification to the terminal apparatus 500.

The information processing of the first embodiment may be realized by causing the processor of the storage management apparatus 2 to execute a program. The information processing of the second embodiment may be realized by causing the processor 103 of the storage apparatus 100, the processor 201 of the operation management server 200, and the processors of the virtual machine management server 300 and the host server 400 to execute a program. The program may be recorded in a computer-readable storage medium.

The program may be stored in a storage medium so as to be distributed, for example. Further, the operations of the access unit 120, the snapshot unit 130, the backup unit 140, the issuance processing unit 220, the storage control unit 230, and the virtual machine management unit 310 may be realized by a plurality of programs, and the programs may be distributed separately. Further, the operations of the access unit 120, the snapshot unit 130, the backup unit 140, the issuance processing unit 220, the storage control unit 230, and the virtual machine management unit 310 may be divided and are realized by a plurality of computers. The computer may store (install) the program stored in the recording medium in its storage device such as the RAM 202, the HDD 203, and so on, and may read and execute the program from the storage device, for example.

Note that features of certain embodiments may be combined with features of other embodiments as long as no inconsistency arises.

According to one aspect, it is possible to back up accurate actual data corresponding to a snapshot, with reduced processing load.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage system comprising:
a storage management apparatus that:
transmits a snapshot creation instruction, after transmitting an update prevention instruction to prevent data in a first storage area from being updated by an information processing apparatus, the first storage area being an object that is accessed from the information processing apparatus; and
transmits a cancelling instruction, upon receipt of a completion notice, to cancel a prevention of updating data in the first storage area by the information processing apparatus, and
a storage apparatus including
a storage device that includes the first storage area, a second storage area and a third storage area, and
a controller that:
executes a first snapshot creation process and a first backup process, the first snapshot creation process being a process that creates a first snapshot of the first storage area in the third storage area, the first backup process being a process that copies all the data in the first storage area to the second storage area,
updates first data among the data in the first storage area in response to a request of updating the first data from the information processing apparatus after completion of executing the first snapshot creation process and the first backup process,
when the snapshot creation instruction is received after completion of executing the first snapshot creation process and the first backup process, executes both of a second snapshot creation process and a second backup process in a condition where updating the data in the first storage area by the information processing apparatus is stopped by using the update prevention instruction, the second snapshot creation process being a process that creates a second snapshot of the first storage area in the third storage area by using a copy-on-write scheme, the second backup process being a process that copies updated data among the data in the first storage area to the second storage area, and upon completion of executing the second snapshot creation process and the second backup process, transmits the completion notice to the storage management apparatus and restarts to receive a request of updating second data among the data in the first storage from the information processing apparatus having received the cancelling instruction.

2. The storage system according to claim 1, further comprising:

a virtual machine management apparatus that manages an operation of a virtual machine that operates on the information processing apparatus;

wherein the storage management apparatus transmits the update prevention instruction to the virtual machine management apparatus; and wherein upon receiving the update prevention instruction, the virtual machine management apparatus stops the operation of the virtual machine.

3. The storage system according to claim 2, wherein:

the first storage area stores at least data that realizes a virtual storage area of the virtual machine or information that defines configuration of the virtual machine;

the storage management apparatus transmits the update prevention instruction to the virtual machine management apparatus, together with first instruction information that indicates creation of a snapshot of the virtual machine;

upon receiving the first instruction information and the update prevention instruction, the virtual machine management apparatus stops the operation of the virtual machine, and subsequently transmits second instruction information that requests creation of a snapshot of the first storage area to the storage management apparatus; and upon receiving the second instruction information, the storage management apparatus transmits the snapshot creation instruction to the storage apparatus.

4. The storage system according to claim 3, wherein:

upon receiving the first instruction information and the update prevention instruction from the storage management apparatus, and upon receiving third instruction information that indicates creation of a snapshot of the first storage area from an apparatus other than the storage management apparatus, the virtual machine management apparatus stops the operation of the virtual machine, and subsequently transmits the second instruction information that requests creation of a snapshot of the first storage area to the storage management apparatus; and upon receiving the second instruction information transmitted from the virtual machine management apparatus in response to the first instruction information and the update prevention instruction, the storage management apparatus instructs the storage apparatus to execute both the second snapshot creation process and the second backup process, and upon receiving the second instruction information transmitted from the virtual machine management apparatus in response to the third instruction information, the storage management apparatus instructs the storage apparatus to execute the second snapshot creation process.

5. A storage management apparatus comprising:

an interface that communicates with a storage apparatus, the storage apparatus including a storage device that includes a first storage area, a second storage area and a third storage area, the first storage area being an object that is accessed from an information processing apparatus; and a processor that performs a procedure including:

after completing an execution of a first snapshot creation process and a first backup process and updating first data among data in the first storage area in response to a request of updating the first data from the information processing apparatus by the storage apparatus, transmitting an update prevention instruction to prevent the data in the first storage area from being updated by the information processing apparatus, the first snapshot creation process being a process that creates a first snapshot of the first storage area in the third storage area, the first backup process being a process that copies all the data in the first storage area to the second storage area, after transmitting the update prevention instruction, transmitting to the storage apparatus an execution instruction to cause the storage apparatus to execute a second snapshot creation process and a second backup process in such a way that the second snapshot creation process and the second backup process are executed in a condition where updating the data in the first storage area by the information processing apparatus is stopped in response to the update prevention instruction, the second snapshot creation process being a process that creates a second snapshot of the first storage area in the third storage area by using a copy-on-write scheme, the second backup process being a process that copies updated data among the data in the first storage area to the second storage area, and upon receipt of a completion notice, transmitting a cancelling instruction to cause the storage apparatus to cancel a prevention of updating data in the first storage area by the information processing apparatus, the completion notice being transmitted from the storage apparatus upon completion of executing the second snapshot creation process and the second backup process.

6. A non-transitory computer-readable storage medium storing a storage management program that causes a computer to perform a procedure for managing an operation of a storage apparatus including a storage device, the procedure comprising:

after completing an execution of a first snapshot creation process and a first backup process and updating first data among data in a first storage area in response to a request of updating the first data from an information processing apparatus by the storage apparatus, transmitting an update prevention instruction to prevent the data in the first storage area from being updated by the information processing apparatus, the first storage area being an object that is accessed from the information processing apparatus and being included in the storage device; the first snapshot creation process being a process that creates a first snapshot of the first storage area in a third storage area included in the storage device, the first backup process being a process that copies all the data in the first storage area to a second storage area included in the storage device, after transmitting the update prevention instruction, transmitting to the storage apparatus an execution instruction to cause the storage apparatus to execute a second snapshot creation process and a second backup process in such a way that the second snapshot creation process and the second backup process are executed in a condition where updating the data in the first storage area by the information processing apparatus is stopped in response to the update prevention instruction, the second snapshot creation process being a process that creates a second snapshot of the first storage area in the third storage area by using a copy-on-write scheme, the second backup process being a process that copies updated data among the data in the first storage area to the second storage area, and upon receipt of a completion notice, transmitting a cancelling instruction to cause the storage apparatus to cancel a prevention of updating data in the first storage area by the information processing apparatus, the completion notice being transmitted from the storage apparatus upon completion of executing the second snapshot creation process and the second backup process.

\* \* \* \* \*